Dec. 15, 1970  H. R. HUTCHINSON  3,547,622
D.C. POWERED PLASMA ARC METHOD AND APPARATUS
FOR REFINING MOLTEN METAL
Filed June 12, 1968  2 Sheets-Sheet 1

INVENTOR
HERMAN R. HUTCHINSON
BY
Stanley Bilker
ATTORNEY

Dec. 15, 1970  H. R. HUTCHINSON  3,547,622
D.C. POWERED PLASMA ARC METHOD AND APPARATUS
FOR REFINING MOLTEN METAL
Filed June 12, 1968  2 Sheets-Sheet 2
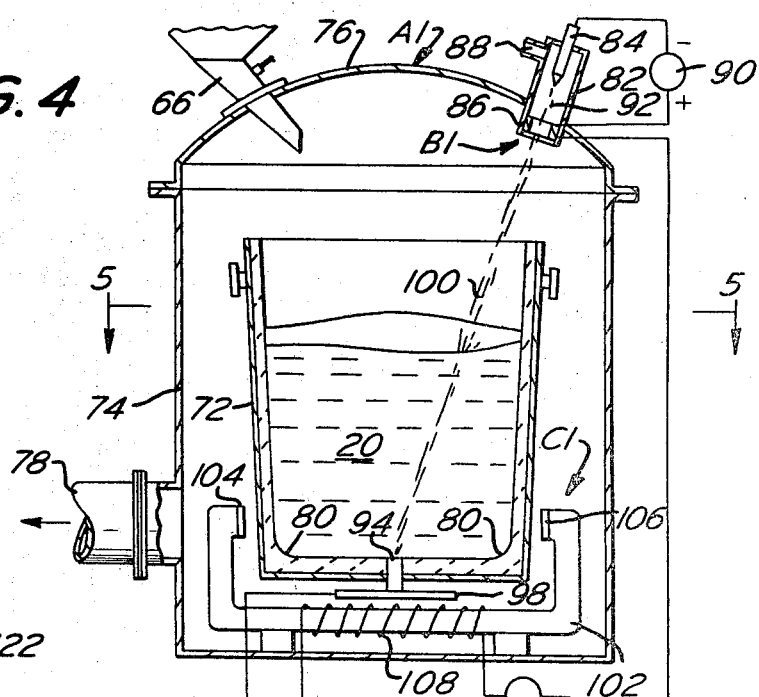
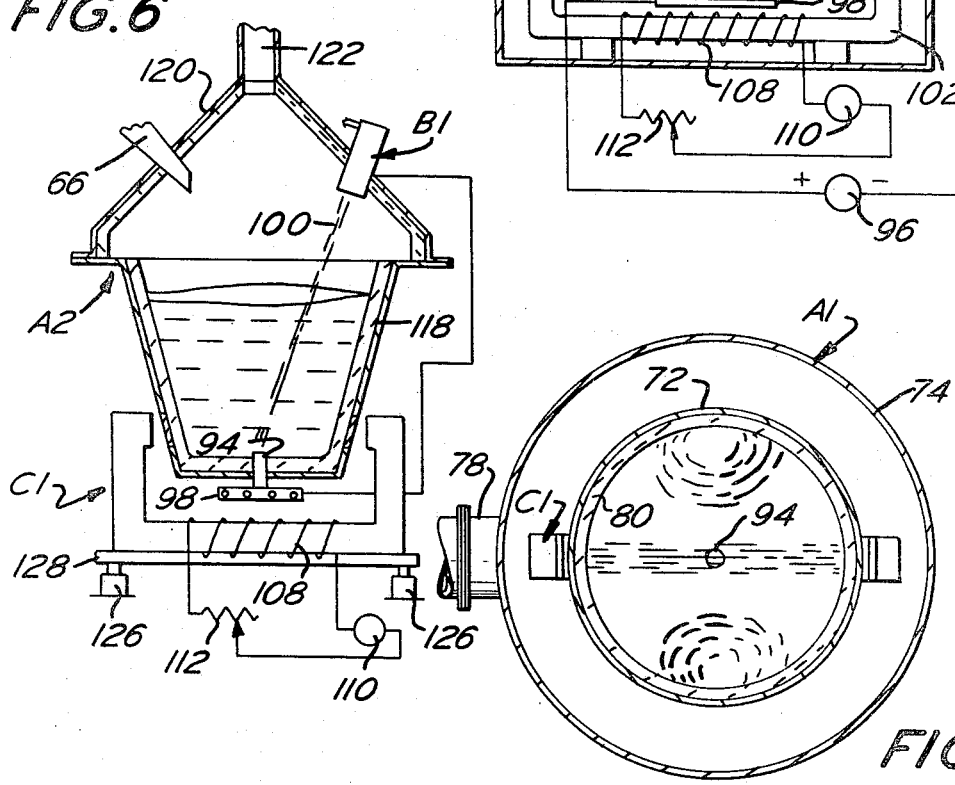
INVENTOR
HERMAN R. HUTCHINSON
BY
*Stanley Bilker*
ATTORNEY United States Patent Office 3,547,622
Patented Dec. 15, 1970

3,547,622
D.C. POWERED PLASMA ARC METHOD AND APPARATUS FOR REFINING MOLTEN METAL
Herman R. Hutchinson, Wyncote, Pa., assignor to Pennwalt Corporation, Philadelphia, Pa., a corporation of Pennsylvania
Filed June 12, 1968, Ser. No. 736,493
Int. Cl. C21c 7/00; C22d 7/00; H05c 7/00
U.S. Cl. 75—10                                13 Claims

ABSTRACT OF THE DISCLOSURE

Apparatus for simultaneously heating, stirring, and degassing molten steel under vacuum by impinging an ionized gas column from a plasma arc upon the surface of the metal and passing a high amperage D.C. current through the column and the molten bath. A D.C. magnetic field interposed through the bath normal to the line of current coacts with the magnetic flux produced by the latter and moves the molten steel in a direction of quadrature thereby taking advantage of the high temperature and current capabilities of the plasma arc.

BRIEF SUMMARY OF INVENTION

This invention relates to the refining of metals, and more particularly relates to a degassing apparatus and procedure in which a molten bath of the metal is simultaneously subjected to heat and stirring while under vacuum. The instant invention is especially concerned with the use of high current plasma arc heating devices in combination with steady state and/or pulsed D.C. magnetic fields.

In the manufacture of metals and alloys, molten metal is usually poured from a melting furnace to a ladle from which it is later transferred to molds for forming ingots. In order to obtain high quality castings or forgings, it has been customary in recent years to expose the molten metal in the ladle to a vacuum so as to remove deleterious gas inclusions, especially oxygen, nitrogen and hydrogen. In ladle degassing, the ladle with its molten metal contents is either placed in a vacuum chamber or capped with a hood in communication with a vacuum pumping system. During the period of time that the molten metal is exposed to vacuum, the molten metal bath is preferably stirred by induction currents passed therethrough, in the case of magnetic alloys, such as steel, or agitated mechanically such as by passing inert gas bubbles through the melt. The stirring or agitation allows the molten bath to be in motion and prevents stagnancy of metal below the static head whereby all portions of the melt can be efficiently and economically degasified.

Still another method of degassing is to draw the molten metal up from the ladle into an overhead vacuum chamber through both of two hollow legs are conduits dipped into the molten bath. In order to cause the metal to move up one leg through the vacuum chamber and down the other, it is necessary to create a difference in head between the legs either by mechanical or induction pumping or by blowing gas bubbles up through the "riser" leg. The foregoing is known as R–H continuous circulation degassing.

In either ladle degassing or continuous circulation by the R–H system, it is frequently desirable to add heat to the molten metal being degassed in order to prevent premature solidification. As is well known, the frequency of induction currents for producing stirring action in the molten bath, which could only be a magnetic composition, such as steel, is too low (.5 cycle to 1.0 cycle per second) to be effective for incorporating heat. Conversely, the frequency of induction currents for imparting heat to the molten mass is incompatible with effective stirring. Furthermore, where gas bubble agitation was employed in the case of nonmagnetic and/or steels for stirring or effecting a syphon action in the dipped dual tube continuous degassing chamber, considerable erosion was produced in the refractory linings adjacent the entrance of the gas bubbles, such as to accelerate the deterioration of the refractories.

In the past, attempts have been made to utilize electric arc heating devices employing carbon electrodes from which current was passed through the melt. However, the violent boil produced during vacuum degassing caused partial immersion of such carbon electrodes with consequent contamination of the melt or required spacing the electrodes so far from the surface of the melt as to be inoperative. In addition, the electric arc type of furnace requires the use of an A.C. supply which would continuously provide a reversing field so as to be inoperative to move metal in a predetermined direction.

It is therefore an object of this invention to provide an apparatus and method for refining of all metals by simultaneously heating and stirring a molten bath of the metal under vacuum.

Another object of this invention is to provide an apparatus and method employing a plasma arc gun for refining molten metal.

Still another object of this invention is to provide an apparatus and method for stirring and heating nonmagnetic as well as magnetic metals under vacuum.

Yet another object of this invention is to provide an apparatus and method for electrically agitating molten metal baths entirely by D.C. electrical systems.

A still further object of this invention is to provide a heating and stirring apparatus for refining molten metal wherein a single D.C. generator or supply will furnish power for actuating both the heating and stirring devices.

Yet a further object of this invention is to provide a degassing apparatus in which minimal erosion of refractories is produced by the stirring forces.

Yet still another object of this invention is to provide a heating, stirring, and degassing system for refinement of molten metals in a furnace, in a ladle, or by continuous circulation from a molten bath through a twin tube immersion chamber.

An additional object of this invention is to provide a twin tube immersion degassing apparatus through which nonmagnetic molten metals may be pumped without the use of mechanical pumps or gas bubble levitation.

Other objects of this invention are to provide an improved device and method of the character described which is easily and economically produced, which is sturdy in construction and which is highly efficient and effective in operation.

BRIEF DESCRIPTION OF THE FIGURES

With the above and related objects in view, this invention consists of the details of construction and combination of parts as will be more fully understood from the following detailed description when read in conjunction with the accompanying drawing in which:

FIG. 4 is a sectional view of another embodiment of this invention.

FIG. 5 is a sectional view taken along lines 5—5 of FIG. 4.

FIG. 6 is a sectional view of yet another embodiment of this invention.

Referring now in greater detail to the drawings in which similar reference characters refer to similar parts, there is shown an apparatus for refining of molten metal under vacuum which effects degasification accompanied by heating and stirring action.

In FIGS. 1, 2, and 3, the apparatus comprises a housing A in the form of shell 10 defining a hollow chamber 12 with a pair of downwardly depending hollow legs 14 and 16 which communicate with the interior of the chamber. The housing A is so suspended over a container or ladle 18 of molten metal 20 such that the tubular legs 14 and 16 are immersed in the bath of molten metal to a point below a slag blanket 21 floating thereon. Both the chamber 12 and its legs 14 and 16 as well as the ladle 18 itself are lined with a suitable refractory 15 for resistance to attack of the hot molten metal. The upper portion of the chamber 12 has a conduit or passageway 22 which is coupled to a multistage steam ejection system, not shown, for evacuating the chamber 12 and producing a reduced pressure therein in the range of five to five hundred microns. The vacuum in the housing A draws the molten metal up through both of the tubes 14 and 16 into the interior of the chamber 12 to a predetermined level therein dependent upon the pressure therein, the density of the molten metal and the height of the housing over the ladle 18. Next it is necessary to create a syphoning action between the two legs by creating a difference in the static head of molten metal therein so that motion of the metal will move up the riser tube 14 and down the downcomer tube 16. This system is known as the R-H method for continuous degassing of molten steel.

Figure 1:
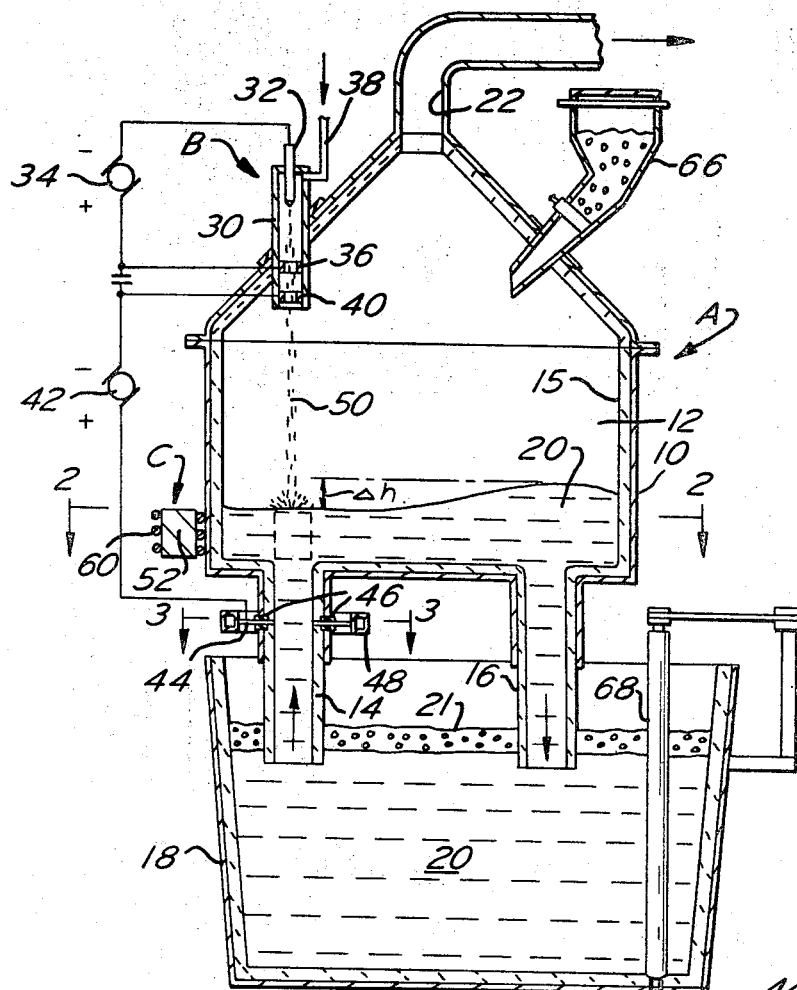
FIG. 1 is a sectional view of a molten metal plasma arc heating and degassing apparatus embodying this invention.

In the present invention, a plasma arc device, generally designated as B, is supported in the housing and directs a hot column of gas upon the surface of the molten metal 20 in the chamber 12 both to heat the metal and pass a high amperage current therethrough. The heat supplied by the plasma arc maintains the molten metal at a predetermined temperature so as to prevent freezing or solidification while the surface is being exposed to vacuum degasification. The current passing through the molten metal creates a magnetic flux therein which cooperates with the magnetic flux of magnetic field producing means, generally designated as C.

By so orienting the current from the plasma arc B passing through the melt in the chamber 12 with respect to the magnetic field created by the magnetic means C, the molten metal can be moved in a preferential direction to increase the height of the column of metal over leg 16 by an amount $\Delta h$. The force which operates to move the metal is determined substantially by the following equation:

$$F = i \cdot l \cdot \beta \cdot \sin \theta$$

where:

F—total resultant force
$i$—current passing through metal
$l$—length of conductor in magnetic field
$\beta$—flux density of magnetic field
$\theta$—angle of the field with respect to the conductor.

The plasma arc device B of the instant invention is represented diagrammatically since many various modes of construction and operation may be utilized, and there is no intention to claim a specific construction herein. However, the essential principles of operation are illustrated to demonstrate the characteristics. In general, the device B comprises a tubular casing 30 which may be water cooled in a well known manner to offset the high temperature of operation. A rod electrode 32 is coupled as a cathode to the negative side of a generator, 34, one side of which may be connected to an anode 36. Gas such as argon is fed in through a port 38 and a nontransferred arc is struck between the electrode 32 and the anode 36. A portion of the arc strikes emitter 40 so as to heat it up to emission temperatures. When the emitter 40 is sufficiently hot, the flow of argon gas stream may be increased to define a gas column through the interior of the chamber. This will be assisted by a stream of gas being evolved from the molten metal in the leg 14 by vacuum alone. Next, a D.C. generator 42 which is coupled from the emitter 40 to an electrode 44 located in the leg 14 is cut in so as to apply a potential to the gas column 50. The D.C. generator 42 is operating at approximately 50 volts will direct a current of approximately 2000 to 10,000 amperes through the ionized gas column and through the molten metal and back to the electrode 44. The flame temperature of the gas column is approximately 26,000° K., and the arc length in the vacuum described can extend 6 to 8 feet.

Figure 3:
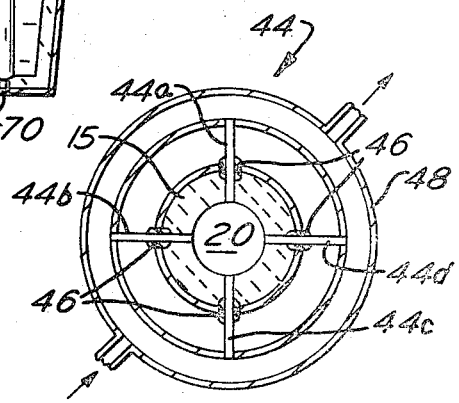
FIG. 3 is a sectional view taken along lines 3—3 of FIG. 1.

The electrode 44, as best shown in FIG. 3, comprises a plurality of spokes 44a, 44b, 44c, and 44d, preferably of graphite or steel, which extend radially through the leg 14. The ends of the electrodes are substantially flush with the interior of the refractory lining 15 thereof. Suitable high temperature sealing grommets 46 electrically insulate the electrode spokes from the steel walls of the leg 14 of the housing A, and act to maintain without leakage the desired vacuum in the chamber 12. Cooling water is circulated through an annular hollow ring 48 enclosing the outboard ends of the spokes 44 and maintaining them at a sufficiently cool temperature to prevent melting in the bath of molten metal.

The plasma arc gun B is mounted in the cover of the housing A preferably such that its exit nozzle is directly over the leg 14. However, the arc will bend to seek its anode where direct overhead mounting is not possible. Electromagnetic deflection is also possible. The ionized gas column 50 is oriented substantially vertically and is maintained in a pure vertical direction by the annular or radial configuration of the electrode 44. The approximately 8,000 amperes of D.C. current passing through the column and in a vertical line through the molten metal develops an annular column of magnetic flux lines polarly oriented in a predetermined direction therein. This electromagnetic field is developed independently of whether or not the molten metal is steel, or other magnetic material.

Figure 2:
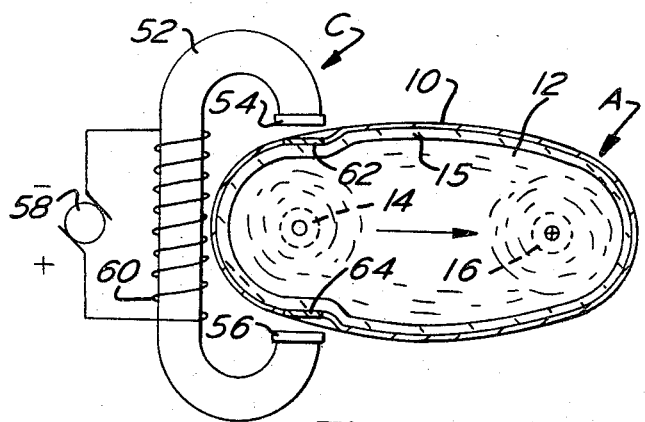
FIG. 2 is a sectional view taken along lines 2—2 of FIG. 1.

The coacting magnetic field means C comprises a suitable soft iron laminated core 52 which is in the configuration of a "C" or partially closed loop whose pole pieces 54 and 56 are adjacently spaced from the housing A directly above the leg 14. See FIG. 2. A D.C. generator 58 directs a high amperage current through the coils 60 such that a dense magnetic field emanating from the pole pieces 54 and 56 intersects the line of current passing through the melt. Suitable nonmagnetic stainless steel windows 62 and 64 are positioned in the housing shell 10 to permit free passage of the flux into the molten metal where the shell 10 is made of a magnetic composition. It is also possible to fabricate the entire shell of a strong nonmagnetic material in order to permit free passage of the flux lines therethrough from the field means C. It is to be noted that the various separately shown generators 32, 42, and 58 may be suitable taps from a single silicon controlled rectifier.

As is apparent by suitable arrangement of the coacting undirectional flux lines produced by the D.C. field creating means C and the current from the plasma arc 50, the molten metal drawn up in the chamber 12 may be caused to roll or move toward and above the downcomer leg 16. The small differential in height $\Delta h$ will begin a syphoning action to continuously circulate molten metal 20 from the ladle 18, up the riser leg 14 through the chamber 12 and down the leg 16 to return to the ladle. All portions of the molten metal may thereby be continuously exposed to vacuum. The heat supplied by the plasma arc B maintains the molten mass at a temperature which prevents solidification during the degassing operation. Addition of alloy materials or other suitable additives can be incorporated during the degassing through hopper 66. When the degassing is completed, the plasma arc generator B, the magnetic means C and the vacuum are cut off whereby the molten metal returns down both legs 14 and 16 to the ladle 18. Thereafter, the ladle is transported to the molds and stopper rod 68 is elevated to permit teeming through nozzle 70.

In FIG. 4 and 5 there is illustrated a housing A1 in which an entire ladle 72 can be loaded. The housing A1 may constitute a lower tank portion 74 into which the ladle 72 is lowered and then hermetically sealed by a lid 76 or can be a suitable compartment into which the ladle may be rolled. The exterior shell of the ladle is preferably of stainless steel or other nonmagnetic metal, and the refractory lining 80 is contoured at the lower corners to provide a smooth dished interior. However, the ladle may also be a carbon steel so long as there are nonmagnetic zones adjacent the magnetic poles to permit the field to extend therethrough. Air and other gases are exhausted from the tank housing A1 by way of pipe 78 coupled to a multistage steam ejection or other suitable vacuum pumping system.

A plasma arc device B1 is mounted in the lid 76 so that the arc column emanating therefrom is directed toward a center portion of the molten bath 20. The plasma gun B1 comprises a tubular nozzle 82 having a rod electrode 84 centrally disposed therein and an annular anode 86 adjacent the lower end thereof. Argon is injected into the nozzle through port 88. A power supply 90 coupling the cathode 84 and anode 86 and develops a nontransferred arc 92 therebetween. The center bottom of the ladle 72 has an anode array 94 extending in a series of vertical spikes upwardly projecting through the refractory lining 80 and insulated from the shell. A D.C. generator 96 is switched in and the argon stream is injected through the nozzle at a greater rate when the chamber pressure reaches about 100 mm wherein an arc column 100 is transferred from the anode 86 to the metal bath 20. A water cooled plate 98 maintains the electrodes 94 at a moderate temperature.

A field producing means C1 comprises a U-shaped laminated soft iron core 102 whose pole pieces 104 and 106 are parallel to the plane of the electrodes 94, and includes a coil 108 which is wound thereabout and connected across D.C. power supply 110 through rheostat 112. The current from the plasma arc and the magnetic field producing means C1 intercept so that the force produced moves the molten metal at the bottom of the ladle in a horizontal plane situated 90° to the direction of the magnetic flux. Consequently, the molten metal is turned over in the manner of a rolling wave, creating a crest at the upper portion of FIG. 5 and a depression at the lower portion thereof. Thus, the magnetic or nonmagnetic molten metal in the ladle is constantly being turned over to fully expose all portions to the degasifying vacuum. At the same time, heat is incorporated into the melt by way of the energy from the plasma arc 100.

In FIG. 6, there is shown a still further modification in which the housing A2 comprises a domed cover 120 for a ladle 118. Air and gas is exhausted through upper pipe 122 and a plasma arc B1 mounted in the lid or cover 120 throws an ionized gas column 100 and high amperage current into the molten bath. Similarly, the D.C. magnetic field producing means C1 directs a flux at right angles to the line of current passing through the molten bath so as to roll and turn over the molten mass as in the modification shown in FIGS. 4 and 5. The cover 120 may be lowered onto the rim flange of the ladle 118 or a hydraulic jack 126 can elevate the ladle 118 on platform 128.

As is apparent from the foregoing description, the heating, stirring, and degassing operation can be applied to ladle and/or continuous degassing systems by incorporating heat and high current into the melt by way of D.C. plasma arc devices, and interposing a unidirectional flux from a D.C. magnetic source normal to the current path in the molten mass. No mechanical stirring or gas bubbling devices are necessary. It is also apparent that the same principles are applicable to furnace operations whereby the metal may be melted and simultaneously refined under vacuum degassing conditions.

Although this invention has been described in considerable detail, such description is intended as being illustrative rather than limiting since the invention may be variously embodied, and the scope of the invention is to be determined as calimed.

What is claimed is:

1. Apparatus for heating, stirring and degassing molten metal comprising:
   a housing containing a confined bath of molten metal,
   means for evacuating gas from said housing to expose the molten metal to a vacuum of a predetermined reduced pressure,
   means constituting a plasma arc gun spaced substantially above the surface of the molten metal, including an electrode submerged in the molten metal bath and a D.C. voltage coupled across said gun and said electrode, for impinging a high temperature ionized gas column upon the surface of the molten metal to effect heating thereof and simultaneously passing a very high amperage D.C. current in a line through the molten metal bath to said electrode, and
   means for interposing a unidirectional magnetic field through the molten metal bath substantially perpendicular to and intersecting the line of current passing therethrough whereby the molten bath will circulate substantially in a vertical direction and permit underlying portions of the molten bath to be subjected to vacuum degassification.

2. The apparatus of claim 1 wherein the line of current passing through the molten metal is substantially vertical and the magnetic flux is created by a D.C. energized magnet whose field is interposed parallel to the base of the housing.

3. The apparatus of claim 2 wherein the magnetic flux passes through the molten bath adjacent the base of the housing.

4. The apparatus of claim 1 wherein said housing comprises a hollow chamber having a pair of hollow legs downwardly depending therefrom for drawing the molten metal upwardly to a predetermined level therein upon application of said means for evacuating to an upper interior portion thereof, a second container having a pool of molten metal immersing both of the hollow legs, and said magnetic field being interposed along a line substantially normal to the plane containing the centerlines of said hollow legs whereby the level of molten metal will be higher in one leg than the other so as to cause the metal to circulate through the hollow chamber in a flow direction upwardly in the leg having the lesser static head and downwardly to the container.

5. The apparatus of claim 4 wherein said plasma arc means comprises a transferred arc.

6. The apparatus of claim 5 wherein one of the transferred arc electrodes is connected to the interior of one of said legs.

7. The apparatus of claim 6 wherein the transferred arc electrode comprises a plurality of circumferentially spaced conductive members radially extending through the walls of said one leg.

8. The apparatus of claim 6 wherein said transferred arc electrode is water cooled.

9. The apparatus of claim 1 wherein said housing encloses a ladle of the molten metal.

10. The apparatus of claim 1 wherein said housing includes a ladle and a lid detachably sealed thereover.

11. A method for refining metal comprising the steps of:
  exposing a bath of molten metal to a vacuum;
  impinging an ionized gas column of a plasma arc upon the surface of the metal and directing a D.C. current from the column through the molten metal bath, and
  interposing a unidirectional magnetic field through the molten bath substantially normal to the axis of the D.C. current passing therethrough.

12. The method of claim 11 wherein the magnetic field is generated by a D.C. source.

13. The method of claim 12 wherein the magnetic field is generated by the same D.C. source as the D.C. current passing through the plasma arc.

References Cited
UNITED STATES PATENTS

| | | | |
|---|---|---|---|
| 2,951,890 | 9/1960 | Yeomans et al. | 13—34 |
| 3,154,404 | 10/1964 | Lorenz | 75—10 |
| 3,212,767 | 10/1965 | Müller | 266—34 |
| 3,342,250 | 9/1967 | Treppschuh | 164—50 |

ALLEN B. CURTIS, Primary Examiner

P. D. ROSENBERG, Assistant Examiner

U.S. Cl. X.R.

13—9; 75—49; 164—50; 266—34